United States Patent [19]

Nakanishi et al.

[11] Patent Number: 6,140,417
[45] Date of Patent: Oct. 31, 2000

[54] VINYL CHLORIDE RESIN COMPOSITION

[75] Inventors: Yasushi Nakanishi, Akashi, Japan; Mamoru Kadokura, Kraainem; Karin Janssen, Diest, both of Belgium; Akira Takaki, Kobe; Yasuhiro Miki, Himeji, both of Japan

[73] Assignees: Kaneka Corporation, Osaki, Japan; Kaneka Belgium N.V., Westerlo-Oevel, Belgium

[21] Appl. No.: 09/203,333

[22] Filed: Dec. 2, 1998

[30] Foreign Application Priority Data

Dec. 4, 1997 [JP] Japan ..................................... 9-334315

[51] Int. Cl.$^7$ ........................................................ C08L 33/04
[52] U.S. Cl. ............................. 525/85; 525/84; 525/263; 525/235; 524/523; 524/569; 523/201
[58] Field of Search ................................. 525/85, 84, 263, 525/235; 524/569, 523; 523/201

[56] References Cited

U.S. PATENT DOCUMENTS

| 4,520,166 | 5/1985 | Kamada et al. | 525/85 |
| 4,670,509 | 6/1987 | Aoyama et al. | 525/85 |
| 4,965,130 | 10/1990 | Min et al. | 428/407 |
| 4,997,859 | 3/1991 | Min et al. | 523/201 |

FOREIGN PATENT DOCUMENTS

| 975890 | 10/1975 | Canada . |
| 0 136 552 | 4/1985 | European Pat. Off. . |

*Primary Examiner*—James J. Seidleck
*Assistant Examiner*—Olga Asinovsky
*Attorney, Agent, or Firm*—Armstrong, Westerman, Hattori, McLeland & Naughton

[57] ABSTRACT

A vinyl chloride resin composition having a greatly improved processability without lowering the transparency wherein the gelation property of a vinyl chloride resin is improved with greatly decreased generation of ungelled substance; which comprises a vinyl chloride resin and 0.1 to 30 parts by weight of a processing aid per 100 parts by weight of said vinyl chloride resin, wherein said processing aid is a polymer prepared by polymerizing (B) 40 to 94 parts by weight of a monomer mixture comprising 60 to 100% by weight of methyl methacrylate, 0 to 40% by weight of at least one monomer selected from the group consisting of an alkyl acrylate and an alkyl methacrylate different from methyl methacrylate and 0 to 10% by weight of other vinyl monomer copolymerizable therewith, in the presence of a first latex prepared by emulsion-polymerizing (A) 3 to 30 parts by weight of a monomer mixture comprising 0 to 50% by weight of methyl methacrylate, 50 to 100% by weight of an alkyl acrylate and 0 to 20% by weight of other vinyl monomer copolymerizable therewith, and polymerizing (C) 3 to 30 parts by weight of a monomer mixture comprising 0 to 50% by weight of methyl methacrylate, 50 to 100% by weight of an alkyl acrylate and 0 to 20% by weight of other vinyl monomer copolymerizable therewith in the presence of the resulting second latex, the total amount of said mixtures (A), (B) and (C) being 100 parts by weight.

3 Claims, No Drawings

VINYL CHLORIDE RESIN COMPOSITION

BACKGROUND OF THE INVENTION

The present invention relates to a vinyl chloride resin composition having an excellent processability and being capable of giving a molded articles excellent in physical properties, and more particularly to a vinyl chloride resin composition containing as a processing aid a polymer composed mainly of methyl methacrylate and other alkyl methacrylate or an alkyl acrylate.

Polyvinyl chloride is widely used in various fields because it provides molded articles excellent in physical and chemical properties. However, polyvinyl chloride has various problems in processing, for example, the temperature range adoptable to the molding is relatively narrow because the processing temperature is close to the thermal decomposition temperature and, moreover, it takes long time to become in a molten state.

At present, many techniques to overcome the above-mentioned problems in processing are known. Representative techniques thereof are, for example, addition of a plasticizer to polyvinyl chloride homopolymer, use of a vinyl chloride resin wherein vinyl chloride is copolymerized with other monomers, and mixing of polyvinyl chloride homopolymer with other resin components.

However, by any of these techniques the processability could not be improved sufficiently with keeping excellent physical and chemical properties inherent to polyvinyl chloride. For example, when a plasticizer is added to polyvinyl chloride or when a vinyl chloride resin wherein vinyl chloride is copolymerized with other monomers is used, physical properties of molded articles prepared therefrom are remarkably altered. Main purpose of mixing polyvinyl chloride with other resin components is to reduce the melt viscosity in molding processing to thereby lower the processing temperature. This manner can improve the fluidity of polyvinyl chloride in the appearance, however, in practice the gelation of polyvinyl chloride occurs insufficiently because the kneading energy is consumed by the fluidizing. Thus, the product is inferior in physical properties to a sufficiently gelled polyvinyl chloride even though its appearance is transparent.

In order to solve the problems as mentioned above, JP-B-40-5311 proposes to incorporate as a processing aid a copolymer comprising methyl methacrylate as a main component, which has a relatively high molecular weight, into polyvinyl chloride. However, the added processing aid is apt to remain as an ungelled substance (generally called "fish eyes") in the product and, therefore, the appearance of the product is easy to be impaired. Furthermore, there is a problem that further effects desired to be produced by adding a processing aid such as enhancement of molded article gloss, improvement of secondary processability and decrease in specific gravity of molded foam, are not sufficiently exerted.

JP-B-52-49020 and JP-B-53-2898 propose to incorporate as a processing aid a two-stage polymer which is prepared by polymerizing a major amount of an acrylic acid ester or a methacrylic acid ester other than methyl methacrylate in the presence of a latex of polymethyl methacrylate or a copolymer containing a major amount of methyl methacrylate. This proposal has a certain effect on preventing generation of an ungelled substance. However, the proposed processing aid is not still satisfactory, because when the processing aid is added to a vinyl chloride resin, there often occur phenomena which are assumed to result from insufficient dispersion of the processing aid into the vinyl chloride resin, e.g., deterioration of transparency of a molded article, decrease in degree of gelation, deterioration of secondary processability such as elongation at high temperatures and the like.

In the case of using a processing aid having a very high molecular weight, it is easily expected that the effect of giving a viscosity and an elasticity to a vinyl chloride resin becomes higher. However, it is also well known that, in the case of using a processing aid the molecular weight of which is simply increased, the above-mentioned phenomena due to poor dispersibility occur remarkably.

In order to eliminate the problems, such as the generation of an ungelled substance and the deterioration of transparency, which are encountered in such a high molecular weight region, Japanese Patent No. 2,515,014 proposes to adjust the particle size of a latex of a two-stage polymer to at most 1,000 Å, wherein the latex is prepared by polymerizing a component containing a major amount of methyl methacrylate and subsequently adding and polymerizing a component containing a major amount of an alkyl acrylate. However, this technique cannot produce a sufficient effect for improving the gelation property and, therefore, the use of a resin composition incorporated with such a processing aid is limited in some cases.

French Patent No. 2,180,595 discloses a technique wherein a component having a relatively low glass transition temperature which mainly comprises an acrylic acid ester is used as a core for the two-stage polymerization. The object of this technique is to prevent a vinyl chloride resin from adhering to a metal surface at processing, to suppress an increase in viscosity of a vinyl chloride resin and to suppress revelation of an elasticity of a melted resin represented by Barus effect, by the use of a processing aid having a relatively low molecular weight. This processing aid has no improvement in processability and the like as achieved by the present invention.

As described above, generation of an ungelled substance and deterioration of a transparency resulting from a processing aid incorporated into a vinyl chloride resin are undesirable, because of not only exhibiting no effect of the processing aid, but also impairing excellent physical and chemical properties that the vinyl chloride resin originally possesses. If the problem of the generation of an ungelled substance is solved, it is possible to give a higher effect of a processing aid by using the processing aid in the same amount as in a conventional one and to decrease the amount of the processing aid for giving the same degree of effect as that achieved by a conventional one. Additionally, it is possible to prevent deterioration of physical properties which results from increasing the molecular weight of a processing aid and, therefore, it is possible to expect a processing aid which can be used in an improved high efficiency. In the preparation of a processing aid, dusting easily occurs when a polymer is separated from a latex. Dusting is undesirable because occurrence of dusting makes it inconvenient to handle the polymer.

It is an object of the present invention to provide a vinyl chloride resin composition having an excellent processability and being capable of giving a molded article excellent in physical properties.

A further object of the invention is to provide a processing aid which can improve the gelation property of a vinyl chloride resin by the use in a smaller amount and, resultingly, which suppresses remarkably the generation of an ungelled substance and which remarkably improves the processability without deteriorating the transparency.

A further object of the present invention is to provide a processing aid which is hard to cause dusting and, therefore, is easy to handle.

These and other objects of the present invention will become apparent from the description hereinafter.

SUMMARY OF THE INVENTION

It has now been found that the above objects can be achieved when using, as a processing aid for vinyl chloride resins, a three-stage polymer which is prepared by, in the presence of a latex of a copolymer prepared by emulsion-polymerizing a monomer mixture mainly comprising an alkyl acrylate, polymerizing a monomer mixture mainly comprising methyl methacrylate and subsequently polymerizing a monomer mixture mainly comprising an alkyl acrylate in the resulting latex. By using such a three-stage polymer having an outer layer of a specific composition as a processing aid for vinyl chloride resins, it is possible to notably exert effects expectable from adding a processing aid with the use of a small amount, such as promotion of gelation, improvement of secondary processability, decrease in specific gravity of molded foams and enhancement of molded article gloss, without impairing excellent physical and chemical properties that vinyl chloride resins inherently possess. Further, this three-stage polymer has the advantage that it is hard to cause dusting when recovered from a latex and consequently is easy to handle.

Thus, in accordance with the present invention, there is provided a vinyl chloride resin composition comprising a vinyl chloride resin and 0.1 to 30 parts by weight of a processing aid per 100 parts by weight of said vinyl chloride resin, wherein said processing aid is a polymer prepared by polymerizing (B) 40 to 94 parts by weight of a monomer mixture comprising 60 to 100% by weight of methyl methacrylate, 0 to 40% by weight of at least one monomer selected from the group consisting of an alkyl acrylate and an alkyl methacrylate different from methyl methacrylate and 0 to 10% by weight of other vinyl monomer copolymerizable therewith, in the presence of a first latex prepared by emulsion-polymerizing (A) 3 to 30 parts by weight of a monomer mixture comprising 0 to 50% by weight of methyl methacrylate, 50 to 100% by weight of an alkyl acrylate and 0 to 20% by weight of other vinyl monomer copolymerizable therewith, and polymerizing (C) 3 to 30 parts by weight of a monomer mixture comprising 0 to 50% by weight of methyl methacrylate, 50 to 100% by weight of an alkyl acrylate and 0 to 20% by weight of other vinyl monomer copolymerizable therewith in the presence of the resulting second latex, the total amount of said mixtures (A), (B) and (C) being 100 parts by weight.

It is preferable that the polymer used as the processing aid has a specific viscosity of at least 1 measured at 30° C. with respect to a solution of 0.4 g of said polymer in 100 ml of benzene.

It is also preferable that the polymer used as the processing aid has an average particle size of at most 1,000 Å in the form of an aqueous latex.

The vinyl chloride resin composition of the present invention has excellent transparency and processability with an excellent gelation property.

DETAILED DESCRIPTION

A feature of the present invention is to use, as a processing aid for vinyl chloride resins, a three-stage polymer having an outer layer of a specific composition instead of two-stage polymers as conventionally used as the processing aid.

The vinyl chloride resin composition of the present invention comprises 100 parts by weight of a vinyl chloride resin and 0.1 to 30 parts by weight of the processing aid as mentioned above.

The vinyl chloride resin used in the present invention includes vinyl chloride homopolymer and copolymers comprising 80 to 100% by weight of units derived from vinyl chloride and 0 to 20% by weight of units derived from other monomers copolymerizable with vinyl chloride.

Examples of the other monomers copolymerizable with vinyl chloride are, for example, vinyl acetate, propylene, styrene, an acrylic acid ester, e.g., an alkyl acrylate having a $C_1$ to $C_8$ alkyl group such as methyl acrylate, ethyl acrylate, butyl acrylate or 2-ethylhexyl acrylate, and the like. These may be used alone or in admixture thereof.

The vinyl chloride resin is not particularly limited, for example, in an average polymerization degree, and conventionally used vinyl chloride resins can be used therefor.

Examples of the vinyl chloride resin are, for example, polyvinyl chloride homopolymer, a copolymer of at least 80% by weight of vinyl chloride monomer and other monomers copolymerizable with vinyl chloride such as vinyl acetate, propylene, styrene and an acrylic acid ester, post-chlorinated polyvinyl chloride and the like. These may be used alone or in admixture thereof.

In the present invention, as the processing aid for vinyl chloride resins is used a three-stage polymer prepared by emulsion-polymerizing the monomer mixture (A) to give an aqueous latex and subsequently polymerizing the monomer mixture (B) in this latex, and then polymerizing the monomer mixture (C) in the resulting latex. The processing aid imparts excellent properties such as gelation property and processability to the vinyl chloride resins without deteriorating excellent properties such as a transparency of the vinyl chloride resins.

The monomer mixture (A) comprises 0 to 50% by weight of methyl methacrylate, 50 to 100% by weight of an alkyl acrylate and 0 to 20% by weight of other vinyl monomer copolymerizable therewith. By disposing a copolymer prepared from the monomer mixture (A) in the inner layer of the three-stage polymer used as a processing aid, it is possible to promote gelation of a vinyl chloride resin and to prevent generation of an ungelled substance in the composition. Resultingly, a viscosity and an elasticity can be given to the vinyl chloride resin more efficiently.

The other copolymerizable vinyl monomer optionally used is selected according to the purposes of the resulting vinyl chloride resin composition.

Examples of the alkyl acrylate used in the monomer mixture (A) are, for example, alkyl acrylates having a $C_1$ to $C_8$ alkyl group, such as methyl acrylate, ethyl acrylate, butyl acrylate and 2-ethylhexyl acrylate, and the like. These may be used alone or in admixture thereof. Butyl acrylate is especially preferable in achieving the objects of the present invention because of giving a polymer having a low glass transition temperature.

Examples of the other copolymerizable vinyl monomer used in the monomer mixture (A) are, for example, an aromatic vinyl compound such as styrene or α-methylstyrene, an unsaturated nitrile compound such as acrylonitrile, and the like. These may be used alone or in admixture thereof.

The contents of the respective components in the monomer mixture (A) are, from the viewpoint of preventing generation of ungelled substance, lowering a glass transition temperature and the like, 0 to 50% by weight, preferably 20 to 50% by weight, more preferably 30 to 45% by weight of methyl methacrylate, 50 to 100% by weight, preferably 50 to 80% by weight, more preferably 55 to 70% by weight of an alkyl acrylate, and 0 to 20% by weight, preferably 0 to 10% by weight, more preferably 0 to 5% by weight of a vinyl monomer copolymerizable therewith. If the content of methyl methacrylate in the monomer mixture (A) is more than 50% by weight, or if the content of the alkyl acrylate in the monomer mixture (A) is less than 50% by weight, favorable gelation property deteriorates and an ungelled substance is generated. Additionally, it is preferable not to use the other copolymerziable vinyl monomer from the viewpoint of obtaining an excellent gelation property which is a feature of the present invention, however, if required, it can be used in an amount of at most 20% by weight. In the case of using the other copolymerizable vinyl monomer, it is preferable to use it in the smallest possible amount.

The monomer mixture (B) comprises 60 to 100% by weight of methyl methacrylate, 0 to 40% by weight of at least one monomer selected from the group consisting of an alkyl acrylate and an alkyl methacrylate different from methyl methacrylate, and 0 to 10% by weight of other vinyl monomer copolymerizable therewith. The monomer mixture (B) has the same effect as a component used in a conventional processing aid for vinyl chloride resins to improve gelation property and processability.

The other copolymerizable vinyl monomer is used, as occasion demands, according to the purposes of the resulting vinyl chloride resin composition.

Examples of the alkyl acrylate are, for example, methyl acrylate, ethyl acrylate, butyl acrylate, 2-ethylhexyl acrylate and the like. Examples of the alkyl methacrylate different from methyl methacrylate are, for example, ethyl methacrylate, butyl methacrylate, 2-ethylhexyl methacrylate and the like. Each of these alkyl acrylate and alkyl methacrylate different from methyl methacrylate may be used alone or in admixture thereof.

Examples of the other copolymerizable vinyl monomer are, for example, an aromatic vinyl compound such as styrene or α-methylstyrene, an unsaturated nitrile compound such as acrylonitrile, and the like. These may be used alone or in admixture thereof.

The contents of the respective components in the monomer mixture (B) are 60 to 100% by weight, preferably 60 to 90% by weight, more preferably 65 to 85% by weight of methyl methacrylate, 0 to 40% by weight, preferably 0 to 30% by weight, more preferably 0 to 20% by weight of at least one monomer selected from an alkyl acrylate and an alkyl methacrylate different from methyl methacrylate, and 0 to 10% by weight, preferably 0 to 5% by weight, more preferably 0 to 3% by weight of a vinyl monomer copolymerizable therewith.

If the content of methyl methacrylate in the monomer mixture (B) is less than 60% by weight, the transparency and second processability of the obtained composition deteriorate. If the content of at least one monomer selected from an alkyl acrylate and an alkyl methacrylate different from methyl methacrylate is more than 40% by weight, the transparency and processability also deteriorate. If the content of the other copolymerizable vinyl monomer is more than 10% by weight, the gelation property and transparency deteriorate.

The monomer mixture (C) comprises 0 to 50% by weight of methyl methacrylate, 50 to 100% by weight of an alkyl acrylate and 0 to 20% by weight of other vinyl monomer copolymerizable therewith. The composition of the monomer mixture (C) falls within the same range as that of the monomer mixture (A), but is not required to be identical with the monomer mixture (A). The composition of the monomer mixture (C) can be adjusted independently of the monomer mixture (A) according to the purposes of the vinyl chloride resin composition. The monomer mixture (C) provides a polymer having a relatively low glass transition temperature. By polymerizing such a monomer mixture in the presence of a polymer latex prepared from the monomer mixtures (A) and (B), generation of an ungelled substance in the vinyl chloride resin composition can be prevented and also the dusting can be reduced which occurs when the produced polymer is separated from the latex to obtain in the form of a powder.

The contents of the respective components in the monomer mixture (C) are 0 to 50% by weight, preferably 20 to 50% by weight, more preferably 30 to 45% by weight of methyl methacrylate, 50 to 100% by weight, preferably 50 to 80% by weight, more preferably 55 to 70% by weight of an alkyl acrylate, and 0 to 20% by weight, preferably 0 to 10% by weight, more preferably 0 to 5% by weight of a vinyl monomer copolymerizable therewith. If the content of methyl methacrylate in the monomer mixture (C) is more than 50% by weight, or if the content of the alkyl acrylate is less than 50% by weight, an ungelled substance is produced and the dusting is increased which occurs when the processing aid is recovered from the obtained latex. Additionally, it is preferable not to use the other copolymerizable vinyl monomer from the viewpoint of obtaining an excellent gelation property which is a feature of the present invention, however, if required, it can be used in an amount of at most 20% by weight. In the case of using the other copolymerizable vinyl monomer, it is preferable to use it in the smallest possible amount.

The amount of the polymer component prepared from the monomer mixture (A) in 100 parts by weight of the processing aid is from 3 to 30 parts by weight, preferably 5 to 20 parts by weight, more preferably 8 to 15 parts by weight. This component can notably improve the gelation property and processability as a result of the presence in an amount as relatively small as 3 to 30 parts by weight in the inner layer of the three-stage polymer, thus the effect brought by adding a processing aid which is a three-stage polymer can be exhibited in a high efficiency. Hitherto it has never been known that such a minor component has a peculiar effect as described above. If the amount of the polymer component prepared from the monomer mixture (A) is more than 30 parts by weight, the gelation property and transparency of a vinyl chloride resin deteriorate. If the amount is less than 3 parts by weight, the dispersibility of the processing aid into a vinyl chloride resin deteriorates and an ungelled substance tends to be generated.

The amount of the polymer component prepared from the monomer mixture (B) is from 40 to 94 parts by weight based on 100 parts by weight of the processing aid, preferably 60 to 90 parts by weight, more preferably 80 to 90 parts by weight. If the amount of the polymer component prepared from the monomer mixture (B) is more than 94 parts by weight, the dispersibility of the processing aid into a vinyl chloride resin deteriorates and an ungelled substance tends to be generated. If the amount is less than 40 parts by weight, sufficient improvement of the gelation property which is an object of the present invention is not achieved.

The amount of the polymer component prepared from the monomer mixture (C) in 100 parts by weight of the processing aid is from 3 to 30 parts by weight, preferably 5 to 20 parts by weight, more preferably 8 to 15 parts by weight. By covering the surface of the polymer particles prepared from the monomer mixtures (A) and (B) with a polymer having a relatively low glass transition temperature prepared from the monomer mixture (C), generation of an ungelled substance can be prevented and also the dusting can be reduced when the polymer is separated from the resulting latex to give the processing aid powder. If the content of the polymer prepared from the monomer mixture (C) is less than 3 parts by weight, the effects for preventing the generation of ungelled substance and for reducing the dusting are insufficient. If the content is more than 30 parts by weight, the processability deteriorates.

The latex of the polymer useful as the processing aid can be prepared by a conventional emulsion-polymerization method, for example, by the following method.

The monomer mixture (A) is first emulsion-polymerized in the presence of a suitable medium, an emulsifier, a polymerization initiator, a chain transfer agent and the like to give a latex of a polymer of the monomer mixture (A). Then, to the latex of the polymer of the monomer mixture (A), the monomer mixtures (B) and (C) are sequencially added to carry out a polymerization. By such a stepwise polymerization of the respective mixtures, there is obtained a three-stage polymer wherein the polymer of the monomer mixture (A) is formed as an inner layer, and a double-layer covering comprising a layer of the polymer of the monomer mixture (B) and a layer of the polymer of the monomer mixture (C) is formed on the inner layer.

The suitable medium used in the above-mentioned emulsion-polymerization is usually water.

The emulsifier is not particularly limited and known emulsifiers agents can be used. Examples of the emulsifier are, for example, an anionic surfactant such as a fatty acid salt, an alkylsulfuric acid ester salt, an alkylbenzenesulfonic acid salt, an alkylphosphoric acid ester salt or a sulfosuccinic acid diester salt, a non-ionic surfactant such as a polyoxyethylene alkyl ether or a polyoxyethylene fatty acid ester, and the like.

As the polymerization initiator, there can be used a water-soluble or oil-soluble polymerization initiator, a thermally decomposable initiator, a redox initiator and the like. For example, conventional initiators, e.g., an inorganic initiator such as a persulfate, an organic peroxide, an azo compound or the like may be used alone, or may be used as a redox initiator in combination with a sulfite, a hydrogensulfite, a thiosulfate, a primary salt, formaldehyde sodium sulfoxylate or the like. Examples of the persulfate preferred as the polymerization initiator are, for example, sodium persulfate, potassium persulfate, ammonium persulfate and the like. Examples of the preferable organic peroxide are, for example, t-butyl hydroperoxide, cumene hydroperoxide, benzoyl peroxide, lauroyl peroxide and the like.

The polymerization temperature and time are not particularly limited and may be selected suitably so as to obtain desired specific viscosity and particle size in view of the purposes of the obtained vinyl chloride resin composition.

The polymerization in each of the second and third stages can be carried out without undesirable mixing of the monomer mixture to be added with the monomer mixture of the prior stage by adding a monomer mixture to the polymerization system after confirming the completion of the polymerization in the prior stage.

In the latex of the polymer used as the processing aid prepared in the above manner, it is preferable that the average particle size is from 100 to 3,000 Å, especially from 100 to 1,000 Å. When the average particle size is not more than 1,000 Å, there is a tendency that a vinyl chloride resin incorporated therewith can be molded even under a severe processing condition. It is difficult to obtain a latex having an average particle size of less than 100 Å. If the average particle size is more than 3,000 Å, the dispersibility is lowered.

The polymer particles are separated from the polymer latex as prepared in the above manner by salting out or coagulating the latex by addition of a usual electrolyte, or separated by spray-drying the latex in hot air.

The resulting three-stage polymer may be, if required, subjected to treatments such as washing, dehydration and drying in a conventional manner.

Preferably the obtained processing aid is usually in the form of a white powder having an average particle size of 30 to 300 μm.

The processing aid of the present invention can sufficiently exert desired effects, as long as it has a molecular weight within the range of the molecular weight conventionally adapted for processing aids.

However, it is preferable that the specific viscosity measured at 30° C. as to a solution of 0.4 g of the processing aid used in the present invention in 100 ml of benzene is at least 1, especially at least 1.2, more especially at least 1.5 and is at most 7, especially at most 5, more especially at most 3. It is preferable that the specific viscosity is at least 1 because favorable processability can be obtained. If the specific viscosity is more than 7, the transparency tends to deteriorate.

Hitherto, it has been generally assumed that the higher the molecular weight of a processing aid, the higher the effect thereof. However, it is also known that a processing aid the molecular weight of which is simply increased, is not always suitable for practical use, because such a processing aid may deteriorate the gelation property of vinyl chloride resins or the processabilities such as elongation at high temperatures and foamability. In contrast, the processing aid of the present invention, even though the molecular weight thereof is so high as to show a specific viscosity of at least 1, can give sufficient gelation property and processability because of its peculiar layered structure.

A conventional processing aid had poor dispersibility and it was necessary to select a processing condition. In contrast, the processing aid according to the present invention has an excellent dispersibility and a vinyl chloride resin incorporated therewith has an improved processability under conventionally adopted processing conditions such as roll temperature, kinds of additives such as stabilizer and lubricant, and the like (for example, under conditions such that a usual tin-containing compound is processed by an 8-inch test roll at a roll temperature of 160° to 180° C.). However, there is a case that the dispersibility is lowered and the gelation is hard to be promoted, resulting in deterioration of transparency and processability in the case of the specific viscosity of at least 1, under some processing conditions, for example, when the roll temperature is lower than the conventionally adopted temperature (e.g., 140° to 160° C.) or when a lubricant is added in a large amount. In such a case, the problems can be solved by adjusting the average particle size of the latex of the polymer used as the processing aid to a size at most 1,000 Å, preferably at most 800 Å and at least 100 Å.

The latex having an average particle size within the range mentioned above can be used without particular problem under the conventionally adopted conditions mentioned above.

The vinyl chloride resin composition of the present invention can be obtained by incorporating the above-mentioned processing aid to a vinyl chloride resin as mentioned above in a conventional manner.

The amount of the processing aid is from 0.1 to 30 parts by weight, preferably 0.3 to 10 parts by weight, more preferably 0.5 to 5 parts by weight, per 100 parts by weight of a vinyl chloride resin. If the amount of the processing aid is less than 0.1 part by weight, the effect of adding the processing aid is not obtained sufficiently. If the amount of the processing aid is more than 30 parts by weight, excellent mechanical property of a vinyl chloride resin is impaired.

The vinyl chloride resin composition of the present invention may contain various additives such as a stabilizer, a lubricant, an impact modifier, a plasticizer, a coloring agent, a filler and a foaming agent, for practical use, as occasion demands.

The vinyl chloride resin composition of the present invention is excellent in the processability and can be molded by various methods such as blow molding, injection molding, calender molding and extrusion molding. The obtained molded articles are excellent in appearance such as transparency, gloss and surface smoothness and in secondary processability. Additionally, the vinyl chloride resin composition has an excellent property such that when foamed, molded foams having a low specific gravity can be obtained. Accordingly, the vinyl chloride resin composition can be favorably used in all the fields where the processing of vinyl chloride resins is required, for example, in the production of sheets, moldings of complicated shapes, molded foams and the like.

The present invention is more specifically described and explained by means of the following Examples and Comparative Examples in which all % and parts are by weight unless otherwise noted. It is to be understood that the present invention is not limited to these Examples.

In the Examples and Comparative Examples, the measurement and evaluation were made according to the following conditions and methods.

(Average particle size)

The average particle size of a latex was measured by a turbidity method.

(Specific viscosity $\eta_{sp}$)

In 100 ml of benzene was dissolved 0.4 g of a polymer sample, and the specific viscosity $\eta_{sp}$ of the resulting solution was measured by means of a Ubbelohde viscometer maintained at a constant temperature in a water bath of 30° C.

The following properties were evaluated with respect to a vinyl chloride resin composition prepared by incorporating 100 parts of polyvinyl chloride having an average degree of polymerization of 660 with 3 parts of a polymer sample as a processing aid, 1.5 parts of an octyl tin mercaptide stabilizer, 1.5 parts of epoxidized soybean oil, 1.0 part of butyl stearate and 0.5 part of polyethylene glycol fatty acid ester.

(Gelation property)

Fifty-five grams of the vinyl chloride resin composition was kneaded at 150° C. by a small-sized kneading tester (trade mark "Plasticorder" PLE-331, product of BRABENDER OHG) to obtain a kneading time-torque curve. The gelation property was evaluated from the degree of inclination of the straight line which connected the points of the minimum torque and the maximum torque. It was judged that the larger the degree of inclination, the better the gelation property.

(Transparency)

The vinyl chloride resin composition was kneaded by means of 8-inch test rolls at 160° C. for 5 minutes and then press-molded at 170° C. for 15 minutes to give a plate having a thickness of 5 mm. The total light transmission and haze of the obtained plate were measured according to JIS K 6714 to estimate the transparency. The higher the value of total light transmission, the better the transparency. The lower the value of haze, the better the transparency.

(Processability)

The vinyl chloride resin composition was kneaded by means of 8-inch test rolls at 160° C. for 5 minutes and, then, press-molded at 170° C. for 15 minutes to give a plate having a thickness of 1 mm. Using the obtained plate, the elongation at high temperatures was measured according to JIS K 7113 to evaluate the processability. The measurement was made by using Dumbbell No. 2 test specimens according to JIS at 100° C. at a tensile speed of 200 mm/min. The higher the value of elongation, the better the processing aid.

For evaluating the foamability of the vinyl chloride resin composition, the vinyl chloride resin composition was further incorporated with 0.6 part of azodicarboneamide per 100 parts of polyvinyl chloride and mixture was molded at 170° C. by a small-sized extruder equipped with a LABO PLASTOMLL (2D20C made by Toyo Seiki Kabushiki Kaisha) to give a rectangular cellular molded article. The specific gravity of the obtained foam was measured. The lower the value of the specific gravity of the foam, the better the foamability of the vinyl chloride resin composition.

(Ungelled substance)

A vinyl chloride resin composition was kneaded by means of 8-inch test rolls at 160° C. for 5 minutes and then press-molded at 170° C. for 15 minutes to give a sheet having a thickness of 0.1 mm. The number of particles which remain in an area of 100 cm$^2$ was visually counted. The smaller the amount of ungelled substance, the more preferable.

The abbreviations described hereinafter denote the following compounds.

MMA: Methyl methacrylate

BA: Butyl acrylate

EA: Ethyl acrylate

BMA: Butyl methacrylate

AN: Acrylonitrile

EXAMPLE 1

A reactor equipped with a stirrer was charged with 0.5 part of sodium dioctyl sulfosuccinate (emulsifier) and 0.1 part of potassium persulfate (polymerization initiator) which were previously dissolved in water, and thereto was further added water so that the total amount of water became 200 parts. Oxygen in the space of the reactor and in water was removed by introducing nitrogen gas into the reactor and, then, the content therein was heated to 70° C. with stirring. To the reactor was then added dropwise a monomer mixture (A) of 3 parts of methyl methacrylate (MMA) and 7 parts of butyl acrylate (BA) at a rate of about 20 parts per hour. After the completion of the addition, the stirring was further continued for one hour to complete the polymerization substantially. Then, thereto was added dropwise a monomer mixture (B) of 64 parts of MMA and 16 parts of butyl methacrylate (BMA) at a rate of about 20 parts per hour. After the completion of the addition, the stirring was further continued for one hour to complete the polymerization substantially. Then, thereto was added dropwise a monomer mixture (C) of 3 parts of MMA and 7 parts of BA at a rate of about 20 parts per hour. After the completion of the addition, the content was kept at 70° C. for 90 minutes and, then, cooled to give a latex. The polymerization conversion was 99.5%. The average particle size of polymer particles in the latex was 1,200 Å.

The obtained latex was coagulated with an aqueous solution of calcium chloride, heat-treated by raising the temperature up to 90° C., and dehydrated by means of a centrifugal dehydrator to give a dehydrated cake of a polymer. The dehydrated cake was washed with water in an amount three time by weight of the polymer and, then, dried at 50° C. for 15 hours by a concurrent flow drier to give a polymer sample (1) in the form of a white powder.

The polymer sample (1) was estimated in the manner described before. The results are shown in Table 1.

EXAMPLES 2 TO 4 AND COMPARATIVE EXAMPLES 1 TO 3

Polymer samples (2) to (7) were prepared in the same manner as in Example 1 using the components and amounts shown in Table 1. The polymer sample (5) of Comparative Example 1 was a two-stage polymer wherein the polymerization of monomer mixture (A) was not made, but it was obtained in substantially the same manner as in Example 1. The average particle size of polymer particles in all the obtained latexes was within a range of 1,100 to 1,300 Å.

The obtained polymer samples and vinyl chloride resin compositions prepared using them were estimated. The results are shown in Table 1.

TABLE 1

|  | Ex. 1 | Ex. 2 | Ex. 3 | Ex. 4 | Com. Ex. 1 | Com. Ex. 2 | Com. Ex. 3 |
|---|---|---|---|---|---|---|---|
| Polymer sample (Processing aid) Monomer (part) | (1) | (2) | (3) | (4) | (5) | (6) | (7) |
| Monomer mixture (A) | | | | | | | |
| MMA | 3 | 0 | 4 | 3 | — | 0.5 | 10 |
| BA | 7 | 10 | 18 | — | — | 1 | 25 |
| EA | — | — | — | 7 | — | — | — |
| Monomer mixture (B) | | | | | | | |
| MMA | 64 | 64 | 60 | 64 | 72 | 71.5 | 44 |

TABLE 1-continued

|  | Ex. 1 | Ex. 2 | Ex. 3 | Ex. 4 | Com. Ex. 1 | Com. Ex. 2 | Com. Ex. 3 |
|---|---|---|---|---|---|---|---|
| BMA | 16 | 16 | 8 | 16 | 18 | 17 | 11 |
| Monomer mixture (C) | | | | | | | |
| MMA | 3 | 3 | 3 | 3 | 3 | 3 | 3 |
| BA | 7 | 7 | 7 | 7 | 7 | 7 | 7 |
| Specific viscosity $\eta_{sp}$ | 0.8 | 0.7 | 0.8 | 0.8 | 0.8 | 0.9 | 0.7 |
| Gelation property (Nm/sec.) | 0.43 | 0.39 | 0.45 | 0.44 | 0.21 | 0.28 | 0.31 |
| Transparency | | | | | | | |
| Total light transmission (%) | 72.1 | 71.5 | 72.0 | 71.3 | 68.3 | 69.3 | 58.3 |
| Haze (%) | 15.0 | 15.2 | 14.9 | 15.3 | 19.5 | 18.5 | 22.0 |
| Processability | | | | | | | |
| Elongation at high temperatures (%) | 650 | 630 | 610 | 630 | 300 | 400 | 580 |
| Foamability (g/cm$^3$) | 0.72 | 0.75 | 0.71 | 0.76 | 0.91 | 0.85 | 0.83 |

From the results shown in Table 1, it is found that when using the polymer samples (1) to (4) which are a three-stage polymer, the obtained vinyl chloride resin compositions are excellent in gelation property and processability as compared to the polymer sample (5) which is a two-stage polymer known in the prior art. When the amount of the monomer mixture (A) is too small as in the polymer sample (6), a sufficient gelation property is not given. In contrast, when the amount of the monomer mixture (A) is too large as in the polymer sample (7), the effect for improving the gelation property and processability is insufficient and the transparency is deteriorated.

EXAMPLES 5 TO 10 AND COMPARATIVE EXAMPLES 4 TO 6

Polymer samples (8) to (16) were prepared in the same manner as in Example 1 using the components and amounts shown in Table 2. The average particle size of polymer particles in all the obtained latexes was within the range of 1,100 to 1,300 Å.

The results of evaluation of these samples are shown in Table 2.

TABLE 2

|  | Ex. 1 | Ex. 5 | Ex. 6 | Ex. 7 | Ex. 8 | Ex. 9 | Ex. 10 | Com. Ex. 4 | Com. Ex. 5 | Com. Ex. 6 |
|---|---|---|---|---|---|---|---|---|---|---|
| Polymer sample (Processing aid) Monomer (part) | (1) | (8) | (9) | (10) | (11) | (12) | (13) | (14) | (15) | (16) |
| Monomer mixture (A) | | | | | | | | | | |
| MMA | 3 | 3 | 3 | 3 | 3 | 3 | 3 | 3 | 3 | 3 |
| BA | 7 | 7 | 7 | 7 | 7 | 7 | 7 | 7 | 7 | 7 |
| Monomer mixture (B) | | | | | | | | | | |
| MMA | 64 | 80 | 56 | 64 | 56 | 64 | 64 | 40 | 40 | 60 |
| BMA | 16 | — | 24 | — | — | — | 13 | 40 | — | 5 |
| BA | — | — | — | 16 | 24 | — | — | — | 40 | — |
| EA | — | — | — | — | — | 16 | — | — | — | — |
| AN | — | — | — | — | — | — | 3 | — | — | 15 |
| Monomer mixture (C) | | | | | | | | | | |
| MMA | 3 | 3 | 3 | 3 | 3 | 3 | 3 | 3 | 3 | 3 |
| BA | 7 | 7 | 7 | 7 | 7 | 7 | 7 | 7 | 7 | 7 |
| Specific viscosity $\eta_{sp}$ | 0.8 | 1.0 | 0.7 | 1.0 | 0.9 | 0.8 | 0.7 | 0.8 | 0.7 | 0.8 |
| Gelation property (Nm/sec.) | 0.43 | 0.48 | 0.41 | 0.46 | 0.46 | 0.46 | 0.44 | 0.34 | 0.36 | 0.25 |

TABLE 2-continued

|  | Ex. 1 | Ex. 5 | Ex. 6 | Ex. 7 | Ex. 8 | Ex. 9 | Ex. 10 | Com. Ex. 4 | Com. Ex. 5 | Com. Ex. 6 |
|---|---|---|---|---|---|---|---|---|---|---|
| Transparency |  |  |  |  |  |  |  |  |  |  |
| Total light transmission (%) | 72.1 | 74.9 | 71.0 | 70.9 | 70.3 | 71.8 | 70.5 | 60.5 | 63.0 | 58.2 |
| Haze (%) | 15.0 | 15.0 | 15.1 | 15.0 | 16.0 | 15.3 | 14.9 | 21.5 | 18.0 | 25.0 |
| Processability |  |  |  |  |  |  |  |  |  |  |
| Elongation at high temperatures (%) | 650 | 620 | 600 | 580 | 590 | 610 | 630 | 400 | 430 | 300 |
| Foamability (g/cm$^3$) | 0.72 | 0.69 | 0.71 | 0.73 | 0.69 | 6.74 | 0.72 | 0.73 | 0.71 | 0.85 |

From the results shown in Table 2, it is found that, in the case of using the polymer samples (8) to (13), a vinyl chloride resin composition having excellent gelation property, transparency and processability can be obtained whereas the transparency and processability are worse in the case of using the polymer samples (14) and (15) prepared using the monomer mixture (B) which contains an alkyl methacrylate other than methyl methacrylate or an alkyl acrylate in a too large amount. When a small amount of a monomer (acrylonitrile) other than an alkyl methacrylate and an alkyl acrylate is copolymerized as in the polymer sample (13), deterioration of physical properties is not caused. However, when the content of the monomer (acrylonitrile) other than an alkyl methacrylate and an alkyl acrylate is larger than the claimed range, i.e., more than 10%, a gelation property deteriorates and the other physical properties also deteriorate.

EXAMPLES 11 TO 13 AND COMPARATIVE EXAMPLES 7 TO 9

Polymer samples (17) to (22) were prepared in the same manner as in Example 1 using the ingredients and amounts shown in Table 3. The average particle size of polymer particles in all the obtained latexes was within the range of 1,100 to 1,300 Å. The polymer sample was evaluated according to the methods described above and below.

The results are shown in Table 3.

(Coagulability)

The coagulability was estimated on the basis of the strength of a coagulated body obtained by coagulating a latex with an electrolyte in the following manner.

A tube (diameter: 15 mm, length: 30 mm) made of a semi-permeable membrane was filled with a latex and immersed in a 1% aqueous solution of calcium chloride at 50° C. for 30 minutes to give a coagulated body. A stress was applied to the coagulated body at a constant rate of 10 mm/min, in the circumferential direction, and the stress was recorded when the coagulated body was broken. It is understood that the higher the strength of the coagulated body is, the less the dusting occurs when a polymer is separated from a latex to give a powder.

TABLE 3

|  | Ex. 11 | Ex. 12 | Ex. 13 | Com. Ex. 7 | Com. Ex. 8 | Com. Ex. 9 |
|---|---|---|---|---|---|---|
| Polymer sample (Processing aid) Monomer (part) | (17) | (18) | (19) | (20) | (21) | (22) |
| Monomer mixture (A) |  |  |  |  |  |  |
| MMA | 3 | 3 | 3 | 3 | 3 | 3 |
| BA | 7 | 7 | 7 | 7 | 7 | 7 |

TABLE 3-continued

|  | Ex. 11 | Ex. 12 | Ex. 13 | Com. Ex. 7 | Com. Ex. 8 | Com. Ex. 9 |
|---|---|---|---|---|---|---|
| Monomer mixture (B) |  |  |  |  |  |  |
| MMA | 64 | 64 | 60 | 72 | 71.5 | 44 |
| BMA | 16 | 16 | 8 | 18 | 17 | 11 |
| Monomer mixture (C) |  |  |  |  |  |  |
| MMA | 3 | 0 | 4 | — | 0.5 | 10 |
| BA | 7 | 10 | 18 | — | 1 | 25 |
| Specific Viscosity $\eta_{sp}$ | 0.8 | 0.9 | 0.8 | 0.8 | 1.0 | 0.6 |
| Ungelled substance | None | None | None | Many | Many | None |
| Strength of coagulated body (g) | 1200 | 1150 | 1250 | 180 | 300 | 1400 |
| Processability |  |  |  |  |  |  |
| Elongation at high temperatures (%) | 650 | 620 | 630 | 610 | 620 | 300 |

From the results shown in Table 3, it is found that when using the polymer samples (17) to (19) which are a three-stage polymer according to the present invention, no ungelled substance is generated and the coagulability is good. In contrast, in case of containing no monomer mixture (C) like the polymer sample (20) which is a two-stage polymer, or in case that the amount of the monomer mixture (C) is too small like the polymer sample (21), generation of ungelled substances is remarkably increased and the strength of the coagulated body is lowered. It is also found that when the amount of the monomer mixture (C) is too large like the polymer sample (22), the processability is deteriorated.

EXAMPLES 14 AND 15 AND COMPARATIVE EXAMPLES 10 AND 11

Polymer samples (23) and (24) which were a three-stage polymer and polymer samples (5) and (25) which were a two-stage polymer were prepared in the same manner as in Example 1 except that the amounts of the polymerization initiator (potassium persulfate) and the emulsifier (sodium dioctyl sulfosuccinate) were varied to change the specific viscosity $\eta_{sp}$ and the average particle size of polymer particles in latex.

Using each of the obtained polymer samples, vinyl chloride resin compositions were prepared and evaluated. The results are shown in Table 4.

TABLE 4

|  | Ex. 1 | Ex. 14 | Ex. 15 | Com. Ex. 10 | Com. Ex. 11 |
|---|---|---|---|---|---|
| Polymer sample (Processing aid) | (1) | (23) | (24) | (5) | (25) |
| Ingredients (part) | | | | | |
| Monomer mixture (A) | | | | | |
| MMA | 3 | 3 | 3 | — | — |
| BA | 7 | 7 | 7 | — | — |
| Monomer mixture (B) | | | | | |
| MMA | 64 | 64 | 64 | 72 | 72 |
| BMA | 16 | 16 | 16 | 18 | 18 |
| Monomer mixture (C) | | | | | |
| MMA | 3 | 3 | 3 | 3 | 3 |
| BA | 7 | 7 | 7 | 7 | 7 |
| Initiator | 0.1 | 0.06 | 0.03 | 0.1 | 0.06 |
| Emulsifier | 0.5 | 0.8 | 1.1 | 0.5 | 0.8 |
| Specific viscosity $\eta_{sp}$ | 0.8 | 1.5 | 2.7 | 0.8 | 2.0 |
| Average particle size (Å) | 1200 | 1200 | 1300 | 1100 | 1200 |
| Transparency | | | | | |
| Total light transmission (%) | 72.1 | 72.3 | 71.8 | 68.3 | 60.5 |
| Haze (%) | 15.0 | 14.8 | 15.1 | 19.5 | 25.3 |
| Processability | | | | | |
| Elongation at high temperatures (%) | 650 | 720 | 750 | 300 | 310 |
| Foamability (g/cm³) | 0.72 | 0.63 | 0.51 | 0.91 | 0.89 |

From the results shown in Table 4, it is found that in the case of using the polymer sample which is a three-stage polymer, even if the specific viscosity $\eta_{sp}$ is raised, the transparency is not deteriorated and the processability is rather enhanced. In contrast, in the case of using the polymer samples (5) and (25) which are a two-stage polymer prepared using no monomer mixture (A), if the specific viscosity $\eta_{sp}$ is raised, the transparency is deteriorated remarkably.

EXAMPLES 16 TO 18 AND REFERENCE EXAMPLES 1 AND 2

Polymer samples (26) and (27) which were a three-stage polymer were prepared in the same manner as in Example 1 except that the amounts of the polymerization initiator (potassium persulfate) and the emulsifier (sodium dioctyl sulfosuccinate) were varied to change the specific viscosity $\eta_{sp}$ and the average particle size of polymer particles in latex.

Using each of the obtained polymer samples, vinyl chloride resin compositions were prepared and evaluated, provided that, in the evaluation of the transparency and processability, the temperature of 8-inch rolls for kneading the compositions was changed to 150° C. and the press-molding temperature was changed to 160° C. and, in the evaluation of the foamability, the temperature of the extruder was changed to 160° C.

The results are shown in Table 5.

TABLE 5

|  | Ex. 16 | Ex. 17 | Ex. 18 | Ref. Ex. 1 | Ref. Ex. 2 |
|---|---|---|---|---|---|
| Polymer sample (Processing aid) | (1) | (26) | (27) | (23) | (24) |
| Ingredients (part) | | | | | |
| Monomer mixture (A) | | | | | |
| MMA | 3 | 3 | 3 | 3 | 3 |
| BA | 7 | 7 | 7 | 7 | 7 |
| Monomer mixture (B) | | | | | |
| MMA | 64 | 64 | 64 | 64 | 64 |
| BMA | 16 | 16 | 16 | 16 | 16 |
| Monomer mixture (C) | | | | | |
| MMA | 3 | 3 | 3 | 3 | 3 |
| BA | 7 | 7 | 7 | 7 | 7 |
| Initiator | 0.1 | 0.06 | 0.03 | 0.06 | 0.03 |
| Emulsifier | 0.5 | 1.5 | 2.0 | 0.8 | 1.1 |
| Specific viscosity $\eta_{sp}$ | 0.8 | 1.6 | 3.0 | 1.5 | 2.7 |
| Average particle size (Å) | 1200 | 800 | 800 | 1200 | 1300 |
| Transparency | | | | | |
| Total light transmission (%) | 65.0 | 66.3 | 68.4 | 60.3 | 58.1 |
| Haze (%) | 19.3 | 18.5 | 18.3 | 22.1 | 23.8 |
| Processability | | | | | |
| Elongation at high temperatures (%) | 530 | 620 | 650 | 520 | 450 |
| Foamability (g/cm³) | 0.81 | 0.74 | 0.63 | 0.89 | 0.86 |

From the results shown in Table 5, it is found that though the polymer samples (23) and (24) used in Reference Examples 1 and 2 which have a high specific viscosity p and a particle size of 1,200 or 1,300 Å are the same as those used Examples 14 and 15, respectively, such polymer samples show lower transparency and processability, when the processing temperature, namely each of the roll temperature, press-molding temperature and foaming temperature, is lowered by 10° C., as apparent from Reference Examples 1 and 2. On the other hand, when using the polymer samples (26) and (27) having an average particle size of latex of at most 1,000 Å, the transparency does not deteriorate and the processability is rather enhanced under such a processing condition, though the specific viscosity $\eta_{sp}$ of the polymer sample is high. It is understood that the transparency and processability can be improved by using a processing aid the average particle size of latex of which is at most 1,000 Å, even if the molecular weight of the processing aid is increased.

EXAMPLES 19 AND 20 AND COMPARATIVE EXAMPLES 12 AND 13

In order to evaluate the influence of changing the amount of the polymer sample (1) in the vinyl chloride resin composition of Example 1, vinyl chloride resin compositions were prepared in the same manner as in Example 1 except that the amount of the polymer sample (1) was changed from 3 parts to the amounts shown in Table 6.

The results are shown in Table 6.

TABLE 6

|  | Ex. 1 | Ex. 19 | Ex. 20 | Com. Ex. 12 | Com. Ex. 13 |
|---|---|---|---|---|---|
| Polymer sample (Processing aid) | (1) | (1) | (1) | (1) | (1) |
| Amount of polymer sample (part) | 3 | 0.5 | 15 | 0.01 | 40 |
| Gelation property (Nm/sec.) | 0.43 | 0.37 | 0.91 | 0.15 | 1.8 |

TABLE 6-continued

|  | Ex. 1 | Ex. 19 | Ex. 20 | Com. Ex. 12 | Com. Ex. 13 |
|---|---|---|---|---|---|
| Transparency |  |  |  |  |  |
| Total light transmission (%) | 72.1 | 71.9 | 68.7 | 66.5 | — |
| Haze (%) | 15.0 | 15.1 | 16.8 | 19.5 | — |
| Processability |  |  |  |  |  |
| Elongation at high temperatures (%) | 650 | 550 | 830 | 150 | — |
| Foamability (g/cm$^3$) | 0.72 | 0.77 | 0.48 | 1.15. | — |

As shown in Table 6, the vinyl chloride resin compositions containing the polymer sample (1) in amounts within the claimed range have excellent gelation property, transparency and processability. However, in the case of containing the polymer sample (1) in a smaller amount than the claimed range as in Comparative Example 12, sufficient gelation property and processability are not obtained. In the case of containing the polymer sample (1) in a larger amount than the claimed range as in Comparative Example 13, a molded article suitable for evaluating the transparency and processability could not be obtained because of losing homogeneity.

In addition to the ingredients used in the Examples, other ingredients can be used in the Examples as set forth in the specification to obtain substantially the same results.

What we claim is:

1. A vinyl chloride resin composition comprising a vinyl chloride resin and 0.1 to 30 parts by weigh of a processing aid per 100 parts by weight of said vinyl chloride resin, wherein said processing aid is a polymer prepared by polymerizing (B) 40 to 94 parts by weight of a monomer mixture comprising 60 to 100% by weight of methlyl methacrylate, 0 to 40% by weight of at least one monomer selected from the group consisting of an alkyl acrylate and an alkyl methacrylate different from methyl methacrylate and 0 to 10% by weight of vinyl monomer copolymerizable therewith, in the presence of a first latex prepared by emulsion-polymerizing (A) 3 to 30 parts by weight of a monomer mixture comprising 0 to 45% by weight of methyl methacrylate, 55 to 100% by weight of an alkyl acrylate and 0 to 20% by weight of other vinyl monomer copolymerizable, and polymerizing (C) 3 to 30 parts by weight of a monomer mixture comprising 0 to 45% by weight of methyl methacrylate, 55% to 100% by weight of an alkyl acrylate and 0 to 20% by weight of other vinyl monomer copolymerizable therewith in the presence of the resulting second latex, the total amount of said mixtures (A), (B) and (C) being 100 parts by weight.

2. The composition of claim 1, wherein said polymer has a specific viscosity of at least 1 measured at 30° C. with respect to a solution of 0.4 g of said polymer in 100 ml of benzene.

3. The composition of claim 1, wherein said polymer used as the processing aid has an average particle size of at most 1,000 Å in the form of an aqueous latex and said polymer has a specific viscosity of at least 1 measured at 30° C. with respect to a solution of 0.4 g of said polymer in 100 ml of benzene.

* * * * *